United States Patent
Burga et al.

[11] Patent Number: 5,963,396
[45] Date of Patent: Oct. 5, 1999

[54] GLIDE HEAD WITH AN OUTSIDE ACTIVE RAIL

[75] Inventors: Margelus A. Burga, San Jose; Alexander A. Burga, Santa Clara, both of Calif.

[73] Assignee: Marburg Technology, Inc., Milpitas, Calif.

[21] Appl. No.: 08/831,878

[22] Filed: Apr. 2, 1997

[51] Int. Cl.[6] .................................. G11B 5/60; G01B 5/28
[52] U.S. Cl. .................................................. 360/103; 73/105
[58] Field of Search .................................. 360/102–103; 73/105

[56] References Cited

U.S. PATENT DOCUMENTS

| | | | |
|---|---|---|---|
| 3,855,625 | 12/1974 | Garnier et al. | 360/103 |
| 4,532,802 | 8/1985 | Yeack-Scranton et al. | 73/432 |
| 4,635,139 | 1/1987 | Nguyen et al. | 368/25 |
| 4,734,803 | 3/1988 | Nishihira | 360/103 |
| 4,894,740 | 1/1990 | Chhabra et al. | 360/103 |
| 4,928,195 | 5/1990 | Ezaki et al. | 360/103 |
| 5,086,360 | 2/1992 | Smith et al. | 360/103 |
| 5,128,822 | 7/1992 | Chapin et al. | 360/103 |
| 5,237,661 | 8/1993 | Suda et al. | 73/105 |
| 5,287,235 | 2/1994 | Cunningham et al. | 360/103 |
| 5,299,079 | 3/1994 | Kuroda | 360/103 |
| 5,359,480 | 10/1994 | Nepela et al. | 360/103 |
| 5,396,386 | 3/1995 | Bolasna et al. | 360/103 |
| 5,423,111 | 6/1995 | Mori | 29/90 |
| 5,423,207 | 6/1995 | Flechsig et al. | 73/104 |
| 5,497,085 | 3/1996 | Tian et al. | 324/212 |
| 5,513,056 | 4/1996 | Kawasaki et al. | 360/103 |
| 5,526,204 | 6/1996 | French et al. | 360/103 |
| 5,527,110 | 6/1996 | Abraham et al. | 374/5 |
| 5,636,086 | 6/1997 | Bolasna et al. | 360/103 |
| 5,640,089 | 6/1997 | Horikawa et al. | 73/105 |
| 5,677,812 | 10/1997 | Cha | 360/103 |
| 5,689,064 | 11/1997 | Kennedy et al. | 73/105 |

OTHER PUBLICATIONS

Chhabra, D., et al., "Air Bearing Design Considerations for Constant Fly Height Applications," IEEE Transactions on Magnetics, vol. 30, No. 2, Mar. 1994, pp. 417–423.

Primary Examiner—Brian E. Miller
Attorney, Agent, or Firm—Skjerven, Morrill, MacPherson, Franklin & Friel LLP

[57] ABSTRACT

A glide head using a slider with an outside active rail is described. In one embodiment, the trailing end of the outside rail extends beyond the trailing end of the inside rail. Thus, during use, the trailing end of the outside rail is closer to the surface of the magnetic disk because of the slope of the glide head's flight. Accordingly, the outside rail is the active rail. The inside rail may be wider than the outside rail to compensate for additional lift created by the greater length of the outside rail. In an alternative embodiment, the trailing end of the outside rail extends beyond the trailing end of the inside rail and there are notches located in the side edges of the rails. The notches do not extend to the forward tapered ends of the rails nor to the trailing ends of the rails. The notches provide additional stability during the slider's flight and decrease the air bearing area of the rails as needed for fly height requirements. In addition, the testing time is minimized by the wide trailing ends of the rails.

22 Claims, 4 Drawing Sheets

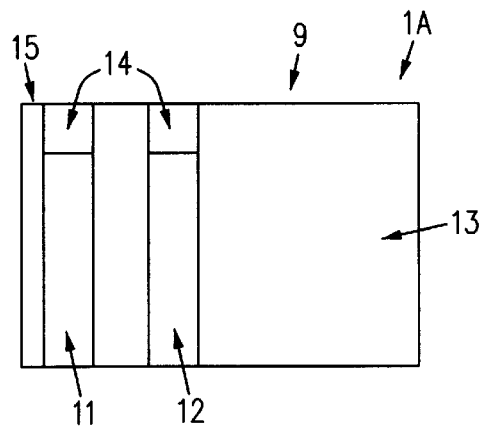
FIG. 4A (PRIOR ART)
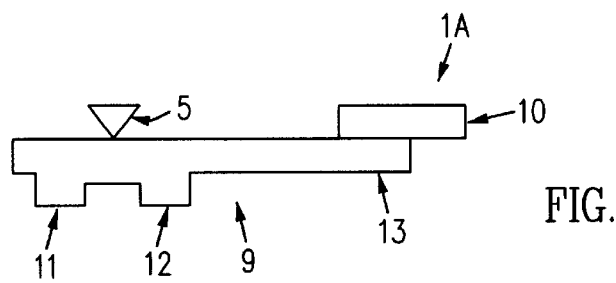
FIG. 4B (PRIOR ART)
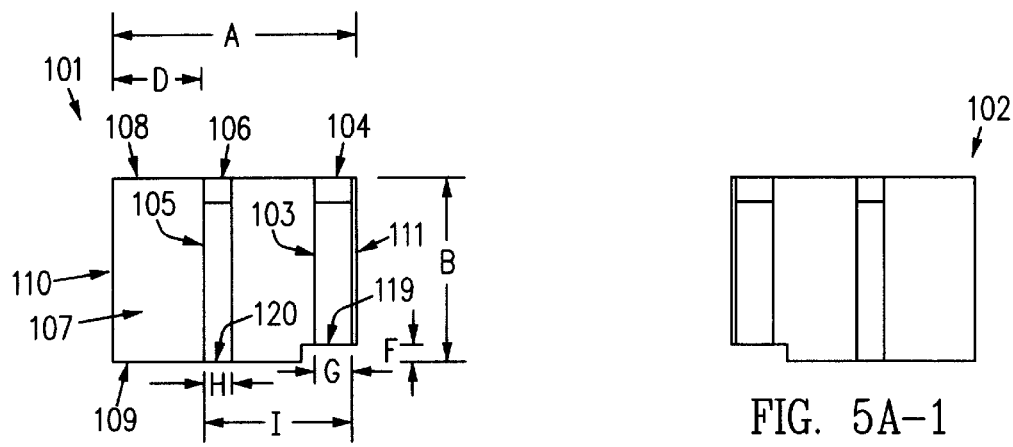
FIG. 5A
FIG. 5A-1
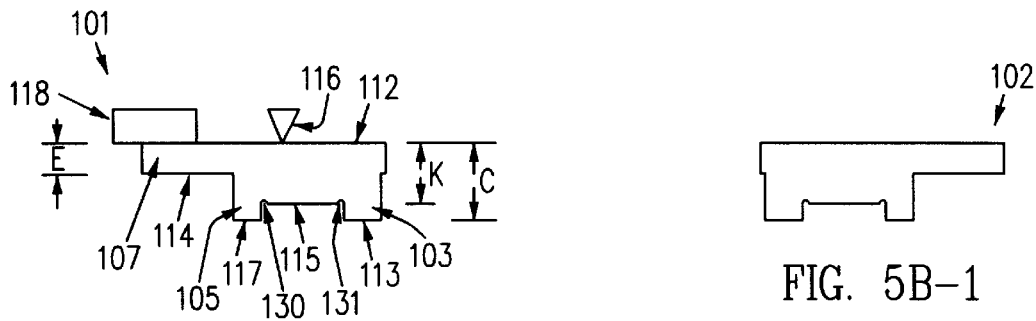
FIG. 5B
FIG. 5B-1

GLIDE HEAD WITH AN OUTSIDE ACTIVE RAIL

FIELD OF THE INVENTION

This invention relates to glide heads used to detect defects on the surface of magnetic or magnetic-optical memory disks such as those used in hard disk drives.

BACKGROUND OF THE INVENTION

A computer hard disk drive comprises a magnetic memory disk mounted on a spindle which is driven by a motor to rotate the magnetic disk at high speed. A read/write head, kept in close proximity to the surface of the rotating magnetic disk, reads or writes data on the magnetic disk. The read/write head is separated from the surface of the magnetic disk by an air bearing created by the high speed rotation of the magnetic disk. The read/write head flies on this air bearing, e.g., at a height of approximately one microinch. The closer the read/write head is to the surface of the magnetic disk, the more information may be written on the disk. Thus, it is desirable for the read/write head to fly as close as possible to the surface of the magnetic disk.

Typical memory disks comprise a substrate that is plated with a hard material such as a nickel phosphorus alloy. The nickel phosphorus is then textured or roughened. An underlayer, a magnetic alloy or magnetic-optical material, and a protective overcoat are then deposited on the nickel phosphorus, e.g., by sputtering. As mentioned above, the disk manufacturing process leaves the surface of the disk in a slightly roughened condition. The precision with which the read/write head flies over the magnetic disk requires that care is taken during manufacturing to assure that there are no protrusions or asperities on the disk surface that may interfere with the read/write head. A protrusion on the surface of the disk that contacts the read/write head during use may damage the head or the disk.

Accordingly, during manufacturing of magnetic or magnetic-optical disks, tests are performed with "glide heads" to determine if there are any asperities, voids or contamination that might interfere with the read/write head. Accurate testing of disks for such defects assures that the disk manufacturer does not unnecessarily reject good quality disks or pass on poor quality disks that may later fail.

During testing, the glide head must fly over the surface of the disk at a height no greater than the minimum fly height of the read/write head. FIG. 1 illustrates a glide head 1 flying over the surface of a magnetic disk 2. Disk 2 spins in the direction of arrow 3 about a spindle 4. Glide head 1 is connected to a suspension arm 5, which maintains the position of glide head 1 relative to disk 2. Suspension arm 5 is controlled by an actuator 7, such as a stepper-motor actuator or a voice-coil actuator, which moves glide head 1 laterally over the surface of magnetic disk 2 in the direction of arrow 6. The lateral movement of glide head 1 is slow relative to the high speed rotation of magnetic disk 2. Similar to a read/write head, glide head 1 flies over an air bearing that is created by the high speed rotation of magnetic disk 2.

FIG. 2 is a side view of magnetic disk 2 with a down facing glide head 1A and an up facing glide head 1B flying over and testing surfaces 2A and 2B of magnetic disk 2, respectively. Air bearings 8A, 8B, created by the high speed rotation of magnetic disk 2, lie between glide heads 1A and 1B and surfaces 2A and 2B, respectively. As in FIG. 1, glide heads 1A and 1B are connected to suspension arms 5A, 5B. Arms 5A, 5B are controlled by actuator 7 to laterally move glide heads 1A, 1B over surfaces 2A, 2B of magnetic disk 2 in the direction of arrow 6.

FIG. 3 shows glide head 1 flying over a section of magnetic disk 2 rotating in the direction of arrow 3. The roughened texture of top surface 2A of magnetic disk 2 is schematically shown in FIG. 3. FIG. 4A shows a bottom surface of down facing glide head 1A. FIG. 4B shows a trailing side 15 of down facing glide head 1A. As shown in FIGS. 4A and 4B, glide head 1A comprises a slider 9, a suspension arm 5 connected to a top surface of slider 9, and a transducer 10, such as a piezoelectric crystal. (Transducer 10 and suspension arm 5 are schematically represented in FIG. 4B.) Slider 9 comprises an inside rail 11, an outside rail 12, and a wing 13. Inside rail 11 and outside rail 12 both have forward tapered ends 14, which are tapered at an angle less than one degree from horizontal (typically an angle between thirty minutes and fifty minutes). Tapered ends 14 provide lift to glide head 1A. Wing 13 provides additional surface area to the top surface of slider 9 upon which transducer 10 is mounted. When rail 11 or 12 impact an asperity or contamination on disk 2 or sink in response to encountering a void, transducer 10 converts the mechanical energy from the event into an electrical signal which can be measured. Generally, however, inside rail 11 generates a stronger signal output voltage when detecting a defect than outside rail 12 when at the same fly height. Accordingly, it is difficult to determine when outside rail 12 is detecting a defect. Also, when a signal is generated by transducer 10, it is difficult to know the size of the defect that caused the signal, because one cannot know whether the signal was created by an encounter with the more sensitive inside rail 11 or the less sensitive outside rail 12.

Because tapered ends 14 of inside rail 11 and outside rail 12 create lift, it is important that as slider 9 moves laterally across the rotating surface of magnetic disk 2, both inside rail 11 and outside rail 12 remain over the surface of magnetic disk 2. In other words, one cannot move slider 9 such that outside rail 12 extends past the outer circumference of disk 2. If outside rail 12 is moved beyond the outer circumference of disk 2, slider 9 will lose its lift under outside rail 12 and will roll, causing slider 9 to contact magnetic disk 2. Accordingly, only outside rail 12 can detect asperities over the outermost portion of the surface of magnetic disk 2. Obviously, the surface of disk 2 adjacent the outer circumference must be tested for asperities. Thus, a glide head that can accurately test the outermost portion of the surface of a magnetic disk without losing its lift is needed.

The distance that slider 9 may move laterally outward along the surface of magnetic disk 2 is determined by the width of rails 11 and 12. In order to cover the entire surface area on magnetic disk 2, slider 9 is moved laterally, step by step, across the surface of magnetic disk 2. Each step must be at least slightly less than the width of one rail in order to test the entire surface of the disk for defects. Accordingly, in order to minimize the time necessary to test each magnetic disk, a glide head with wide rails is desirable.

SUMMARY

A glide head in accordance with our invention uses the outside rail of the slider as the active testing rail. In addition, the rails of the slider are wide so that during testing the length of the steps that the slider is moved laterally over the surface of the magnetic disk can be greater, thereby minimizing testing time.

In one embodiment, the outside rail is longer than the inside rail so that the trailing end of the outside rail extends beyond the trailing end of the inside rail and, thus, the outside rail is more sensitive than the inside rail. The inside rail is wider than the outside rail to compensate for the additional lift on the outside rail created by the greater length of the air bearing surface of the outside rail. By keeping the area of the two rails approximately equal, the slider maintains an equal amount of lift under both rails, thereby preventing the slider from rolling during flight. In another embodiment, the area of the rails is unequal and the location of contact with the suspension arm may be moved to compensate for the increased lift created by the greater area of the outside rail.

In another embodiment, each rail has a notch in the side facing the opposite rail. The notches, however, do not extend all the way to the tapered forward ends of the rails, nor to the trailing ends of the rails. The notches stabilize the slider's flight. The notches also allow the slider to retain wide tapered ends of the rails to provide lift and retain wide trailing ends to minimize testing time.

BRIEF DESCRIPTION OF THE DRAWINGS

FIGS. 4A and 4B are bottom plan and end views, respectively, of a glide head in accordance with prior art.

FIGS. 5A and 5B are bottom plan and end views, respectively, of a down facing outside active rail glide head in accordance with the invention.

FIGS. 5A' and 5B' are bottom plan and end views, respectively, of an up facing outside active rail glide head in accordance with the invention.

DETAILED DESCRIPTION

Figure 1:
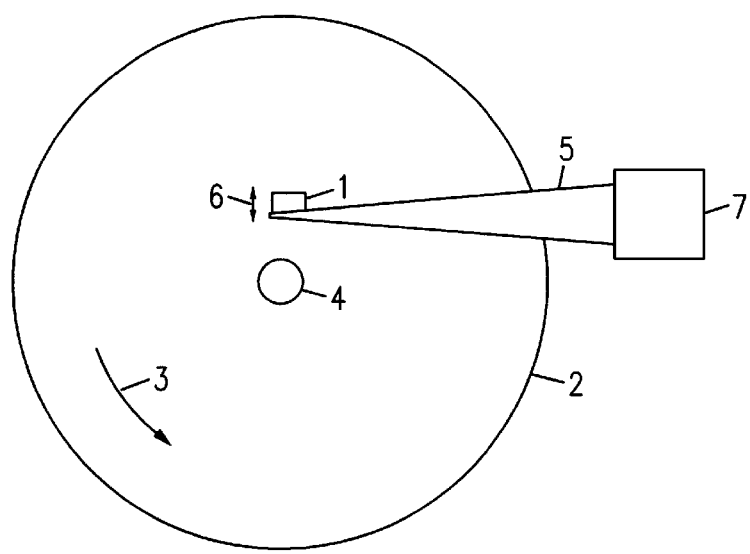
FIG. 1 illustrates in plan view a glide head connected to a suspension arm over a rotating magnetic disk in accordance with the prior art.
Figure 2:
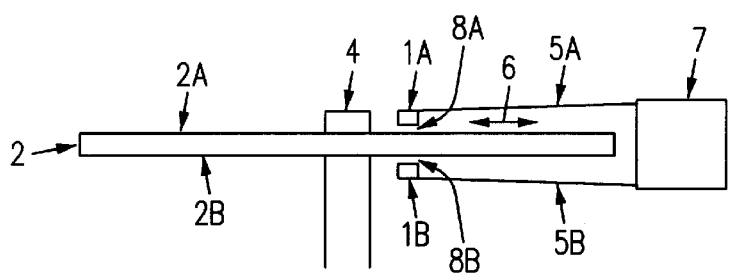
FIG. 2 is a side view of glide heads flying over both the top and bottom surfaces of a magnetic disk in accordance with the prior art.
Figure 3:
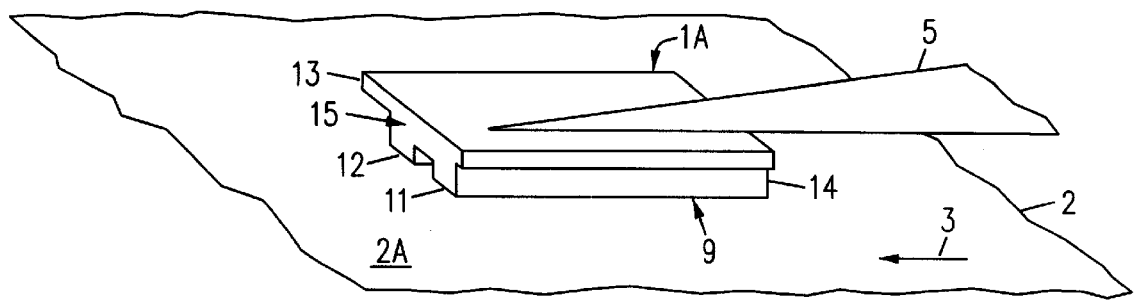
FIG. 3 is a perspective view of a glide head connected to a suspension arm over the rotating magnetic disk in accordance with the prior art.

FIGS. 5A, 5A', 5B, and 5B' illustrate 50% sliders with an outside active rail. The term "50%" is well known in the art, and refers to the size of the slider. FIG. 5A is a bottom plan view of a down facing slider 101 and FIG. 5A' is a bottom plan view of a corresponding up facing slider 102. FIG. 5B is an end view of a down facing slider 101 and FIG. 5B' is an end view of a corresponding up facing slider 102. For simplicity, only down facing slider 101, illustrated in FIGS. 5A and 5B, will be discussed, but it should be understood that up facing slider 102 is similar to down facing slider 101, but in mirror image, as illustrated in FIGS. 5A' and 5B'.

As shown in FIGS. 5A and 5B, slider 101 has an inside rail 103 and an outside rail 105. Both inside rail 103 and outside rail 105 have forward tapered ends 104 and 106, respectively. Forward tapered ends 104 and 106 have an angle of approximately sixty minutes from the horizontal. However, in other embodiments, other angles can be used, e.g., from thirty minutes to one degree. Slider 101 is approximately 0.10 inches in width from its outside edge 110 to inside edge 111 (distance A in FIG. 5A), 0.078 inches in length from its forward end 108 to trailing end 109 (distance B), and 0.024 inches high from top surface 112 to the air bearing surfaces 113, 117 of the rails 103, 105 (distance C). It should be understood, however, that all dimensions are merely by way of example, and the invention is not limited to a slider with these dimensions. Other sizes may be used.

Slider 101 has an extension or wing 107 that extends slider 101 outward from outside rail 105 approximately 0.040 inches (distance D), thereby increasing the area of top surface 112 of slider 101. Wing 107 is approximately 0.01 to 0.015 inches thick (i.e., distance E between top surface 112 of slider 101 and bottom surface 114 of wing 107). As can be seen in FIG. 5A, outside rail 105 is longer than inside rail 103. Outside rail 105 traverses the entire length of slider 101 from forward end 108 to trailing end 109 and is thus 0.078 inches long (distance B). Inside rail 103 extends to forward end 108, but is approximately 0.007 inches short of trailing end 109 of slider 101 (distance F). Thus, trailing end 120 of outside active rail 105 extends approximately 0.007 inches beyond trailing end 119 of inside rail 103. However, in other embodiments, outside active rail 105 extends beyond trailing end 119 of inside rail 103 by other distances, e.g., by a distance between 1% to 50% of the length of outside rail 105. In another embodiment, tapered forward end 104 of inside rail 103 may not extend to forward end 108 of slider 101, such that tapered forward end 106 of outside rail 105 extends some distance, e.g., approximately 0.007 inches, in front of tapered forward end 104 of inside rail 103.

Figure 6:
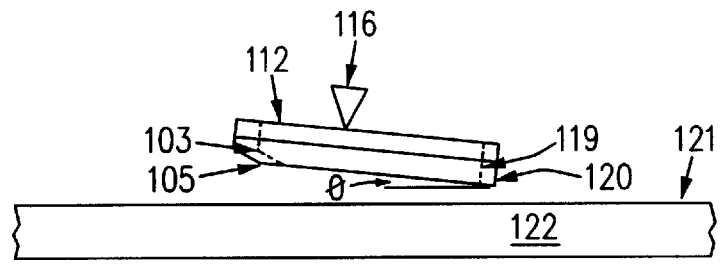
FIG. 6 is a side view of a slider connected to a suspension arm flying over the surface of a magnetic disk.

As shown in FIG. 6, as slider 101 flies over surface 121 of the rotating magnetic disk 122 at a slope angle $\theta$, which generally is approximately 0.015 degrees or less. Because slider 101 flies with a slope angle, trailing ends 119 and 120 of the rails are the closest part of slider 101 to surface 121. Accordingly, trailing ends 119 and 120 are the areas on rails 103 and 105 that are most sensitive to defects on surface 121. Because trailing end 120 of outside rail 105 extends beyond trailing end 119 of inside rail 103 (shown in phantom in FIG. 6), outside rail 105 is closer to surface 121 of the disk. Thus, outside rail 105 is more sensitive than inside rail 103, making outside rail 105 the active rail and inside rail 103 the non-active rail.

Inside non-active rail 103, however, is wider than outside active rail 105 to compensate for the increased lift caused by the greater length of outside active rail 105. The wide inside rail 103 prevents slider 101 from rolling during flight. The width of rails 103 and 105 depends on the fly height requirements and the rotational velocity of magnetic disk 122. By way of example, with slider 101 flying at one microinch at a slope of 0.03 degrees over magnetic disk 122, and disk 122 rotating beneath slider 101 such that the portion of disk 122 under slider 101 travels at 500 inches per second, inside non-active rail 103 may be approximately 0.015 inches wide (distance G) and outside active rail 105 may be approximately 0.012 inches wide (distance H). The distance between the outside edge of outside active rail 105 and the inside edge of inside non-active rail 103 is approximately 0.058 inches (distance I). The inside non-active rail 103 is set in from the inside edge 111 of slider 101 approximately 0.002 inches. The distance between top surface 112 of slider 101 and bottom surface 115 between rails 103 and 105 is approximately 0.02 inches (distance K).

Slider 101 is machined using standard machining methods out of a wafer of aluminum oxide-titanium carbide such as material type no. 310, available from 3M Corporation located in Minnesota. Notches 130 and 131 in bottom surface 115 of slider 101, as shown in FIG. 5B are created during the machining process.

Figure 7:
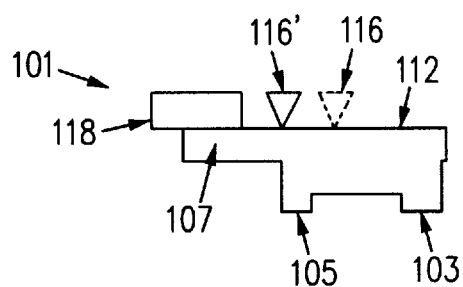
FIG. 7 is a side view of an up facing outside active rail glide head with an offset suspension arm.

Suspension arm 116 (FIG. 5B and FIG. 6) is connected to top surface 112 of slider 101 and provides a gram force on slider 101 toward surface 112. A typical gram force can be approximately 2, 3.5, 6, 9.5, or 15 grams. In an alternate embodiment, the width of inside rail 103 is not increased to compensate for the greater lift of outside rail 105. Instead, as illustrated in FIG. 7, suspension arm 116' may be offset on top surface 112 of slider 101 from the previous embodiment's location for suspension arm 116 (shown in phantom). Offsetting suspension arm 116' prevents roll induced by the additional lift generated from outside rail 105, which is longer than inside rail 103. Thus, in this embodiment, inside rail 103 may have the same width as outside rail 105. An appropriate suspension system arm is a type 2, 4, 13, 18.50 or 19 model available from Magnecom, Inc. of San Diego. A piezoelectric crystal (PZT) 118 (FIG. 5B and FIG. 7) is mounted to top surface 112 of wing portion 107 of slider 101. An appropriate PZT crystal should be of good quality such as is available from Secor, Ltd. located in the United Kingdom.

Figure 8:
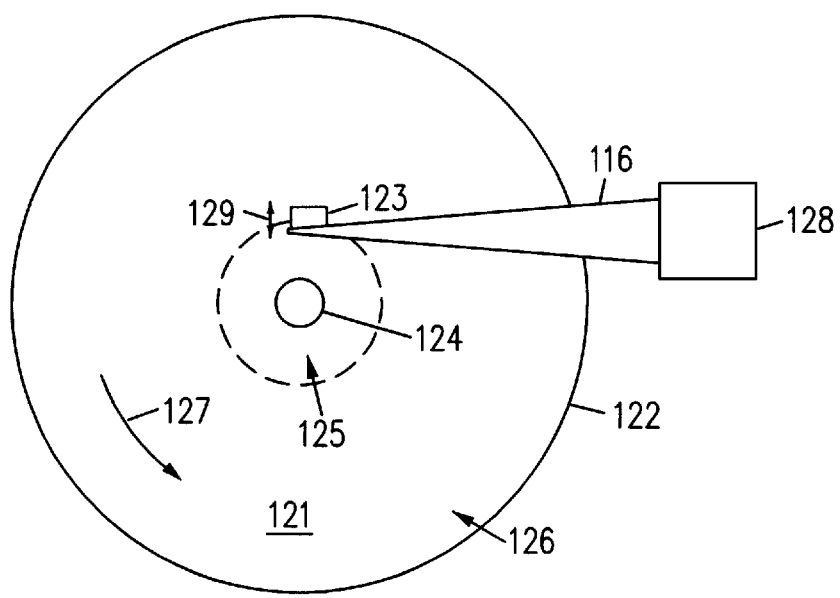
FIG. 8 illustrates in plan view a glide head connected to a suspension arm over the rotating surface of a magnetic disk.

FIG. 8 illustrates an assembled glide head 123 mounted on a suspension arm 116 and over a magnetic disk 122 to be tested. Disk 122 has a landing zone 125 adjacent an inner perimeter of surface 121, near a spindle 124. A data zone 126, where data is stored on magnetic disk 122, is outward from landing zone 125 on surface 121. When magnetic disk 122 is not rotating there is no air bearing generated over surface 121 and glide head 123 rests on surface 121 in landing zone 125. As magnetic disk 122 begins rotation as indicated by arrow 127, an air bearing is generated over surface 121 and lift is provided to glide head 123 by the air bearing. A typical rotational velocity of disk 122 produces a linear velocity of 300 to 500 inches per second beneath glide head 123 during testing. Glide head 123 first tests the landing zone for defects. Magnetic disk 122 rotates at high speed creating a high fly height for glide head 123 during testing of landing zone 125. A concentric circle in the landing zone 125 is tested by glide head 123. An actuator 128 moves glide head 123 laterally across data zone 125 as indicated by arrow 129 so that another concentric circle in landing zone 125 may be tested. When glide head 123 has completed testing landing zone 125 for defects, actuator 128 continues to move glide head 123 laterally across surface 121 into data zone 126. The rotation of magnetic disk 122 is then slowed so that glide head will have a lower fly height, approximately one microinch, during testing of the data zone 126. Actuator 128 continues to move glide head 123 across data zone 126 until the entire area of surface 121 has been tested. Actuator 128 moves glide head 123 laterally across surface 121 by a distance less than the width of outside rail 105. In this manner glide head 123 tests, step by step, the entire area of surface 121 for defects.

Figure 9A:
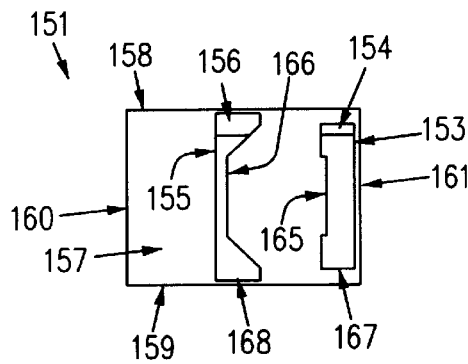
FIGS. 9A and 9B are plan and end views, respectively, of an outside active rail glide head with notches in the rails.
Figure 9B:
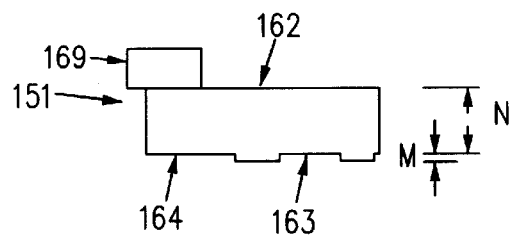

Another embodiment of a slider is shown in FIGS. 9A and 9B. FIGS. 9A and 9B show an ion milled 50% slider with an outside active rail. The 50% slider is illustrated as an example, and any size slider may be made in accordance with this embodiment. The slider body in this embodiment may be manufactured by conventional ion milling. FIG. 9A is a bottom plan view of a down facing 50% slider 151. FIG. 9B is an end view of down facing slider 151. For the sake of simplicity, only down facing slider 151 will be discussed, but it should be understood that a corresponding up facing slider is similar to down facing slider 151, but in mirror image.

In this embodiment, the overall dimensions of slider 151 are similar to the dimensions of slider 101 in FIGS. 5A and 5B. Because slider 151 is ion milled, however, inside non-active rail 153 and outside active rail 155 are only raised approximately 0.0002 inches from a bottom surface 163 (FIG. 9B) of slider 151 (distance M). Accordingly, only minimal material is removed from slider 151 and wing 157, which extends slider 151 outward from outside active rail 155. Thus, slider 151 and wing 157 are thicker than slider 101 and wing 107 (FIGS. 5A and 5B) of the previous embodiment. The distance between top surface 162 of slider 151 and bottom surface 163 of slider 151 between the two rails 153 and 155 is the same distance from top surface 162 of slider 151 and bottom surface 164 of wing 157, approximately 0.035 inches (distance N). The additional thickness in slider 151 and wing 157 increases the overall stiffness. The additional stiffness increases the signal strength of PZT crystal 169, and causes a higher frequency output thereby improving the detection of small defects.

Outside rail 155 is longer than inside non-active rail 153. Trailing end 168 of outside rail 155 extends beyond trailing end 167 of inside rail, again making outside rail 155 the active rail. In addition, as illustrated in FIG. 9A, forward tapered end 156 of outside rail extends beyond forward tapered end 154 of inside rail 153. In this embodiment, the sides of outside active rail 155 and inside non-active rail 153 have notches. Outside active rail 155 has a "V" shaped notch 166 on the inside edge. Inside non-active rail 153 has a "U" shaped notch 165 on the outside edge. Notches 165 and 166, however, do not extend to tapered ends 154 and 156, nor to trailing ends 167 and 168. These notches 165 and 166 stabilize slider 151 during flight, preventing slider 151 from rolling. Notches 165 and 166 decrease the area of rails 153 and 155 as needed for fly height requirements, while still providing the same amount of lift from tapered forward ends 154 and 156. Notches 165 and 166 do not extend to trailing ends 167 and 168 permitting trailing ends 167 and 168 to remain wide. Because slider 151 is moved laterally across the surface of the magnetic disk in steps equal to the width of trailing end 168 of outside rail 155, keeping trailing end 168 wide minimizes testing time. In this embodiment, notches 165 and 166 are formed during the conventional ion milling process. However, it is understood that these notches can be formed using other methods, such as conventional machining. It is further understood that notches 165 and 166 may have shapes other than as described above.

Figure 10A:
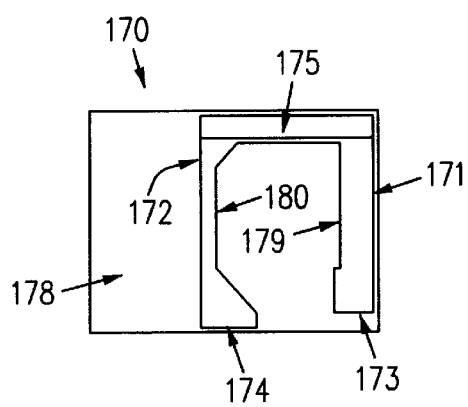
FIGS. 10A, 10B and 10C are plan, end and side views, respectively, of an outside active rail glide head with notches in the rails and connected forward tapered ends.
Figure 10C:
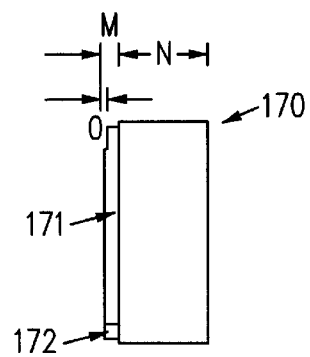
Figure 10B:
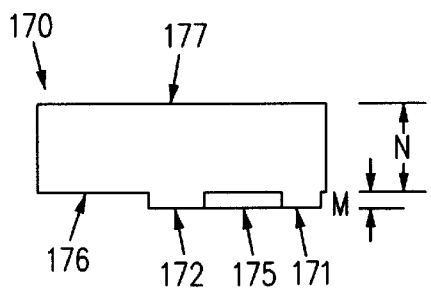

FIGS. 10A, 10B and 10C illustrate another embodiment of a slider in accordance with the present invention. FIGS. 10A, 10B and 10C show a 50% slider. The 50% slider is illustrated as an example, and any size slider may be made in accordance with this embodiment. The slider body in this embodiment may be manufactured by conventional ion milling. FIG. 10A is a bottom plan view of a down facing 50% slider 170. FIG. 10B is an end view of down facing slider 170 and FIG. 10C is a side view of down facing slider 170. For the sake of simplicity, only down facing slider 170 will be discussed, but it should be understood that a corresponding up facing slider is similar to down facing slider 170, but in mirror image.

This embodiment has approximately the same dimensions as the embodiment shown in FIGS. 9A and 9B. As with slider 151, because slider 170 is ion milled inside rail 171 and outside rail 172 are only raised approximately 0.0002 inches from a bottom surface 176 (FIG. 10B) of slider 170 (distance M). Further, the distance between top surface 177 of slider 170 and bottom surface 176 of slider 170 between rails 171 and 172 is the same distance from top surface 177 and bottom surface 176 of wing 178, approximately 0.035 inches (distance N). As in slider 151, slider 170 has notches 179 and 180 in the sides of rails 171 and 172.

Trailing end 174 of outside rail 172 extends beyond trailing end 173 of inside non-active rail 171, again making outside rail 172 the active rail. In this embodiment, however, the forward end of inside rail 171 extends as far forward as the forward end of outside rail 172 and the forward ends of inside rail 171 and outside rail 172 are connected such that there is one forward end 175 that connects outside rail 172 with inside rail 171. Forward end 175 serves to increase stability of slider 170 in flight. Forward end 175 has a step type taper of approximately 0.0001 inches (distance O), as illustrated in FIG. 10C. In another embodiment, forward end 175 may have a beveled taper with an angle between thirty minutes to one degree.

Figure 11:
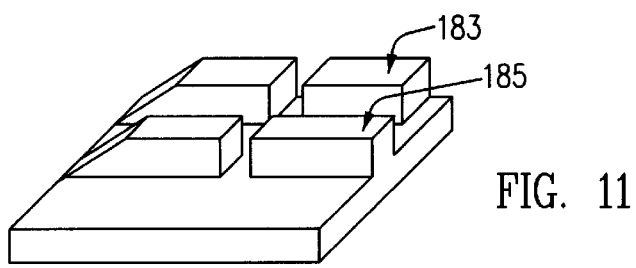
FIG. 11 is a perspective view of an outside active rail glide head with discontinuities in both the inside rail and the outside rail.

Although the present invention is illustrated in connection with specific embodiments for instructional purposes, the present invention is not limited thereto. Various adaptations and modifications may be made without departing from the scope of the invention. For example, the slider material is not limited to aluminum oxide-titanium carbide. The slider surface may be coated with carbide by sputtering or other similar techniques to increase the durability of the slider. Different sizes and dimensions of the slider may be used. Different types of suspensions, and transducers other than piezoelectric crystals may be used. Also as shown in FIG. 11, inside rail 183 and outside active rail 185 need not be continuous and may have gaps or other discontinuities in them. In lieu of providing tapers, one can provide steps in the forward ends of the rails. Accordingly, all such changes came within our invention.

What is claimed is:

1. A glide head to detect defects on a disk substrate, said glide head having a leading end, a trailing end, and an air bearing surface, said glide head comprising:

an inside rail extending downwardly from said air bearing surface, said inside rail having a leading end located toward said leading end of said glide head and a trailing end located toward said trailing end of said glide head;

an outside rail extending downwardly from said air bearing surface, said outside rail having a leading end located toward said leading end of said glide head and a trailing end located toward said trailing end of said glide head, said trailing end of said outside rail extending further in the direction of said trailing end of said glide head than said trailing end of said inside rail, wherein said outside rail generates a greater amount of mechanical energy from encountering a defect than said inside rail; and a transducer mounted on said glide head, said transducer sensing when said glide head encounters a defect, said transducer converting said mechanical energy from encountering said defect into an electrical signal.

2. The glide head of claim 1, wherein said trailing end of said outside rail extends by a distance between 0.001 and 0.02 inches further in the direction of said trailing end of said glide head than said trailing end of said inside rail.

3. The glide head of claim 1, wherein said trailing end of said outside rail extends further in direction of said trailing end of said glide head than said trailing end of said inside rail by a distance equal to 1% to 50% of the length of said outside rail.

4. The glide head of claim 1, wherein said leading end of said outside rail extends further in the direction of said leading end of said glide head than said leading end of said inside rail.

5. The glide head of claim 1, wherein said inside rail has an inside edge and an outside edge, and said outside rail has an inside edge and an outside edge, wherein the distance between said inside edge and outside edge of said inside rail is greater than the distance between said inside edge and said outside edge of said outside rail.

6. The glide head of claim 1, further comprising a top surface and a wing, said wing outwardly extending said top surface of said glide head from said outside rail, said transducer being mounted on said wing.

7. The glide head of claim 1, further comprising a top surface and a wing, said wing outwardly extending said top surface of said glide head from said inside rail, said transducer being mounted on said wing.

8. The glide head of claim 1, wherein a first portion of said outside rail between the leading and trailing ends of said outside rail is narrower than a second portion of said outside rail adjacent said leading end of said outside rail, said first portion also being narrower than a third portion of said outside rail adjacent said trailing end of said outside rail.

9. The glide head of claim 1, wherein a first portion of said inside rail between said leading and trailing ends of said inside rail is narrower than a second portion of said inside rail adjacent said leading end of said inside rail, said first portion also being narrower than a third portion of said inside rail adjacent said trailing end of said inside rail.

10. The glide head of claim 1, wherein said inside rail has an outside edge and a first notch, said first notch being disposed on said outside edge of said inside rail, said first notch extending toward said leading end of said inside rail and extending toward said trailing end of said inside rail, said first notch terminating prior to said trailing end of said inside rail.

11. The glide head of claim 10, wherein said first notch terminates prior to said leading end of said inside rail.

12. The glide head of claim 1, wherein said outside rail has an inside edge and a second notch on said inside edge of said outside rail, wherein said second notch terminates prior to said trailing end of said outside rail.

13. The glide head of claim 12, wherein said second notch terminates prior to said leading end of said outside rail.

14. The glide head of claim 1, wherein said transducer is a piezoelectric crystal.

15. A method of testing the surface of a memory disk for defects, said method comprising:

placing a glide head over said surface, said glide head comprising a slider and a transducer mounted to said slider, said slider having a trailing end and an air bearing surface, wherein said slider comprises an inside rail extending downwardly from said air bearing surface, said inside rail having a trailing end located toward said trailing end of said slider, said slider further comprising an outside rail extending downwardly from said air bearing surface, said outside rail having a trailing end located toward said trailing end of said slider, wherein said trailing end of said outside rail extends further in the direction of said trailing end of said slider than said trailing end of said inside rail whereby said outside rail generates a greater amount of mechanical energy than said inside rail from encountering at least one of an asperity, contamination, and a void on said magnetic disk;

providing a relative motion between said surface of said magnetic disk and said glide head;

said transducer sensing mechanical energy when said glide head encounters at least one of an asperity, contamination, and void on said magnetic disk;

said transducer converting said mechanical energy into an output signal; and monitoring said output signal from said transducer.

16. The glide head of claim 1, wherein said defect is one of at least an asperity, contamination, and void on the surface of said disk substrate.

17. The method of claim 15 wherein said transducer is a piezoelectric crystal.

18. A glide head to detect defects on a disk substrate, said glide head having a leading end, and trailing end, and an air bearing surface, said glide head comprising:

an inside rail extending downwardly from said air bearing surface, said inside rail having a leading end located toward said leading end of said glide head and a trailing end located toward said trailing end of said glide head;

an outside rail extending downwardly from said air bearing surface, said outside rail having a leading end located toward said leading end of said glide head and a trailing end located toward said trailing end of said glide head, said trailing end of said outside rail extending further in the direction of said trailing end of said glide head than said trailing end of said inside rail, wherein said outside rail generates a greater amount of mechanical energy than said inside rail from encountering at least one of an asperity, contamination, and a void; and means for determining when said glide head encounters one of at least an asperity, contamination, and void on a disk substrate.

19. The glide head of claim 18, wherein said means for determining when said glide head encounters a defect on a disk substrate is a piezoelectric transducer.

20. The glide head of claim 18, wherein said inside rail has an inside edge and an outside edge, and said outside rail has an inside edge and an outside edge, wherein the distance between said inside edge and outside edge of said inside rail is greater than the distance between said inside edge and said outside edge of said outside rail.

21. The glide head of claim 18, wherein a first portion of said inside rail between said leading and trailing ends of said inside rail is narrower than a second portion of said inside rail adjacent said leading end of said inside rail, said first portion also being narrower than a third portion of said inside rail adjacent said trailing end of said inside rail.

22. A glide head for testing a rotating media, said glide head having a top surface, a bottom surface, a leading end and a trailing end, said glide head comprising:

a first rail on said bottom surface, said first rail having a first length;

a second rail on said bottom surface, said second rail having a second length, wherein said first length is greater than said second length, said first rail extending further towards said trailing end of said glide head than said second rail;

a taper on the leading end of said first rail and said second rail for providing lift on said leading end of said glide head, wherein said trailing end of said glide head flies closer to said rotating media than said leading end, the trailing end of said first rail flies closer to said rotating media than the trailing end of said second rail such that a defect contacting said trailing end of said first rail will produce more mechanical energy than said defect contacting said trailing end of said second rail; and a piezoelectric crystal mounted on said glide head for converting mechanical energy caused by said first rail or said second rail physically contacting said defect into an electric signal.

\* \* \* \* \*